Dec. 15, 1959 K. SCHWIDEFSKY 2,916,961
COMPARATOR FOR DETERMINING COORDINATES OF A POINT ON A PATTERN
Filed Aug. 19, 1958 2 Sheets-Sheet 1

Inventor
KURT SCHWIDEFSKY
By Toulmin & Toulmin
Attorneys

Dec. 15, 1959  K. SCHWIDEFSKY  2,916,961
COMPARATOR FOR DETERMINING COORDINATES OF A POINT ON A PATTERN
Filed Aug. 19, 1958  2 Sheets-Sheet 2

INVENTOR.
KURT SCHWIDEFSKY
BY Toulmin & Toulmin

ATTORNEYS

United States Patent Office 2,916,961
Patented Dec. 15, 1959

2,916,961

COMPARATOR FOR DETERMINING COORDINATES OF A POINT ON A PATTERN

Kurt Schwidefsky, Aalen, Wurttemberg, Germany, assignor to Carl Zeiss, Heidenheim (Brenz), Wurttemberg, Germany Application August 19, 1958, Serial No. 755,986

Claims priority, application Germany August 20, 1957

10 Claims. (Cl. 88—14)

The present invention relates to a device for obtaining the coordinates of a measuring point in a planar pattern, e.g. an aerial photograph and, more in particular, to such a device in which the pattern, e.g. the aerial photograph, can be displaced relative to a measuring mark in the directions of the coordinates.

It is known to provide computing-recording comparators or stereoscopic comparators with which the coordinates of a certain point in a planar pattern, such as an aerial photograph can be obtained for the interpretation of the photograph.

In these known devices one or two patterns rest on one or two supports, the latter being adapted for displacement relative to one or two measuring marks by means of spindles.

The distance of displacement of the supports carrying the patterns—each measured from a starting point of reference—indicate the coordinate values of a certain point on the pattern congruently disposed with respect to a measuring mark.

Furthermore there are provided counters or other suitable recording devices which are operated directly by the revolution of the spindles, e.g. in such a manner that the number of revolutions of the spindles are indicated by the counters.

These known devices are unsatisfactory and do not operate with the desirable degree of accuracy which is wanted for the interpretation of an aerial photograph.

It has been found that this is primarily due to the fact that the adjustment of a measuring mark to the measuring point as well as the computing of the displacement needed for this adjustment are effected by the spindles; e.g. a counter indicates the number of revolutions performed by the spindles.

It is however impossible to produce spindles with the requisite degree of accuracy. Allowance has to be made for a certain tolerance and, in addition, the accuracy of the spindles is further depreciated by the wear due to continued operation.

The accuracy of measurement is consequently impaired by lost motions occurring between the spindles and the planar patterns.

Furthermore, the known devices do not take into sufficient consideration Abbe's law of the comparator (see e.g. Dr. Ing. Kurt Räntsch: "Die Optik in der Feinmeβ-technik," page 180, last paragraph, and page 181, first paragraph).

A harmful effect is also exercised by fluctuations in temperature causing a different expansion of the metal spindles and the photograph support usually consisting of a glass plate.

Due to all these deficiencies the degree of accuracy of measurement accomplished with the known devices does not substantially exceed one hundredth of millimeters.

It is an object of the present invention to provide a device for obtaining the coordinates of a measuring point in a planar pattern, particularly in an aerial photograph, with which very accurate results are obtained and with which measurements can be made with an accuracy down to a few microns.

It is another object of the present invention to provide a device for obtaining the coordinates of a measuring point in a planar pattern, particularly in an aerial photograph, wherein during the different stages of the measuring operation the field of view is relieved from unnecessary details.

These objects are achieved by the device of the present invention comprising a transparent, planar pattern, for example the slide of an aerial photograph, resting on a plate of transparent material having the same heat expansion coefficient, with a coordinate system engraved therein. There are provided means for displacing this plate together with the pattern relative to a stationary measuring mark. An approximate, coarse measurement can be effected with these means. If more accurate results are wanted, with an accuracy of down to a few microns, there are provided fine measuring means comprising at least one reading scale and means for displacing the same in the directions of the coordinates. Furthermore, the invention comprises two separate lighting means, one for producing light rays transmitted by the plate with the coordinate system, the other producing light rays reflected therefrom.

The two different lighting means are necessary for the following reasons:

When effecting a measuring operation with the device of the present invention, the pattern and the plate with the coordinate system are first displaced until a predetermined measuring point in the pattern approximately coincides with the stationary measuring mark. The lines of the coordinate system closest to the measuring point coarsely indicate the coordinate values of the measuring point.

In most cases it will be desirable and necessary to have more accurate values and for that reason a fine measurement is made by displacing the reading scales in the two coordinate directions until the lines of the coordinate system closest to the measuring point coincide with the neighboring strokes of the reading scales, the displacement of the two scales being indicative of the correcting values of measurement. This fine measurement would be greatly obstructed by the fact that in the field of view there appear the many details of the pattern, the coordinate system and the reading scale.

And even the initial, coarse measurement, i.e. the step of making the measuring point coincide with the measuring mark is rendered difficult by the fact that the coordinate system appears in the field of view, for example in case a line of the system is located close to the measuring point.

For that reason the light source producing light rays transmitted by the plate with the coordinate system is put in operation whenever the coordinate system would obstruct the view, i.e. during the first step of the measuring operation. The light source producing light rays reflected by the plate is used whenever the many details of the pattern would obstruct the view but the coordinate system must appear, i.e. during the second step or the fine measuring operation.

The invention will be better understood upon the following description of the accompanying drawings, wherein Figure 1 is a sectional view of the stereoscopic comparator device of the present invention;

Figure 1:
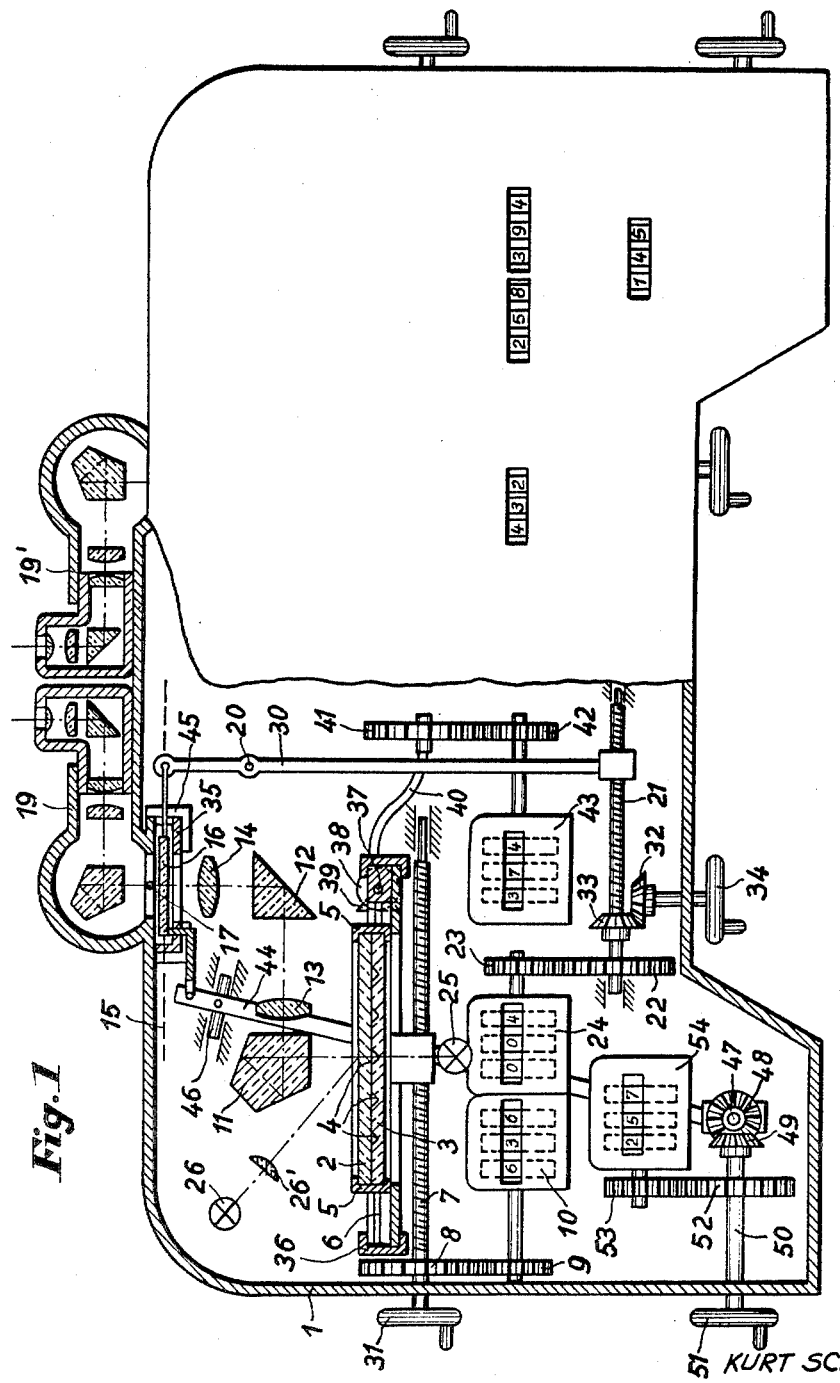

The comparator device of the invention is illustrated by way of example with respect to a stereoscopic comparator comprising two symmetrical units.

Since these two portions are identical, for the sake of clarity only the left unit is shown.

It comprises the casing 1 housing a transparent pattern 2, e.g. a slide of an aerial photographic picture, resting upon a glass plate 3, which latter has engraved the colorless outlines of a coordinate system 4.

Both the glass plate and the pattern 2 are mounted on a cross slide 5, 6. The cross slide 5, 6 can be moved in the plane of the drawing by spindle 7 and it can be moved vertically relative to the plane of the drawing by means of another spindle 37.

The spindle 7 is coupled with a counter 10 via a transmission gear 8, 9 and it is operated by means of a handwheel 31.

The spindle 37 is operated by another handwheel (not shown) and is connected with the counter 43 via transmission gearing 38, 39, a flexible shaft 40 and another transmission gearing 41, 42.

The lighting means for the pattern 2 and the coordinate system 3 comprises a light source 25 for light rays transmitted therethrough and a light source 26 with a condenser 26′ for light rays reflected therefrom. They can be put in operation together or separately by switches.

Furthermore there are provided a pentaprism 11, the lenses 13 and 14 with a reflecting prism 12 disposed therebetween, constituting means for producing in the plane 15 an intermediate image of the pattern, e.g. the photograph, and the coordinate system.

In this same plane 15 there extend the measuring stationary mark 17 and the glass plate 16 the latter containing the reading scales 18 (not visible in Figure 1 of the drawings).

The intermediate image and the measuring mark and reading scales can be viewed through the ocular 19, 19′.

The glass plate-graticule is positioned in a cross slide 35, 45 which can be displaced in the range of the plane 15 of the intermediate image in the plane of the drawing as well as vertically reltative thereto.

The cross slide 35, 45 is displaced by means of the lever 30 fulcrumed at 20 which, in turn, is operated by a spindle 21.

This spindle is connected with a handwheel 34 and a counter 24 by means of transmission gears 32, 33 and 22, 23, respectively.

The cross slide 35, 45 is moved vertically relative to the plane of the drawing by means of a lever 44 fulcrumed at 46 operated by a spindle 47 which latter is coupled with a hand-wheel 51 and the counter 54 via transmission gears 48, 49 and 52, 53, respectively.

*Operation*

Before each measuring operation the cross slide 35, 45 is brought into zero position as indicated by the counters 24 and 54.

Figure 2:
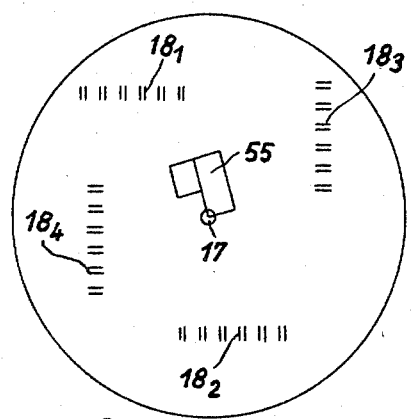
Figure 2 is a plan view of the field of view of the device at the start of the measuring operation.

Thereupon the light source 25 is switched in. As the light rays emitted from this light source are transmitted through the glass plate 3 the ocular 19 shows only a view of the pattern together with the measuring mark 17 and the reading scales ($18_{1-4}$). By turning the spindles 7 and 37 through their respective hand-wheels the cross slide 5, 6 is displaced until a determined point of the pattern 2 coincides with the measuring mark 17 appearing in the center of the field of view of ocular 19. The counters 10 and 43 indicate the approximate values of the coordinates. Figure 2 shows the field of view at this stage of operation.

The only details of the pattern shown are, e.g., a building structure 55, one corner of which constitutes the measuring point coinciding with the measuring mark 17. The clarity and simplicity of this view is in no way impaired by the reading scales $18_1$ through $18_4$ as these are sufficiently spaced from the measuring mark 17.

Figure 3:
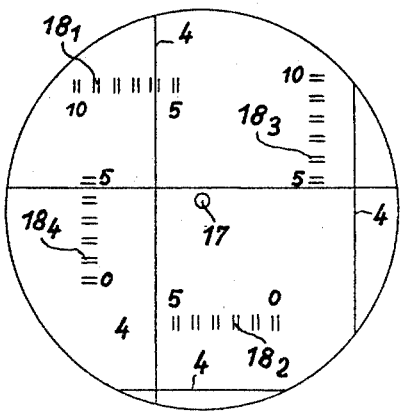
Figure 3 is a plan view of the field of view of the device of the invention at a later stage of the measuring operation.

In the example shown in Figure 3, the light 25 has been turned off and the light 26 is switched on so as to make the coordinate lines 4 visible. As can be seen, an approximate coincidence has been established with the sixth pair of double strokes of the measuring scale $18_1$ by the vertical line of the coordinate system 4 close to the measuring mark 17.

Additional precision is obtained by turning the spindle 21 and thereby displacing the cross slide 35, 45 in the plane of the drawing by a small distance.

Figure 4:
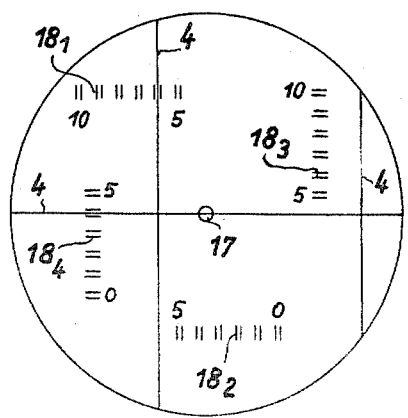
Figure 4 is a plan view of the field of view of the present invention in the reading position of the device at the end of the measuring operation.

The counter 24 then indicates the last three decimals of the abscissa value which is, e.g. 004. Thereupon the hand-wheel 51 is turned, thereby operating the spindle 47, the lever 44 and displacing the cross slide 35, 45 vertically relative to the plane of the drawing until the fourth pair of double marks of the measuring scales $18_4$ coincides with the horizontal line of the coordinate system (see Figure 4).

The counter 54 indicates the last three decimals of the ordinate value, e.g. 257.

The values indicated by the counters 24 and 54 thus correct the values indicated by the counters 10 and 43.

The identical unit in the other half of the casing 1 is then operated in an entirely identical manner. Again, the one corner of the building structure 55 constitutes the measuring point.

The coordinate value obtained in the two units in the left and in the right portion of the device differ by a certain amount, for example 377,610 and −57,888 which is indicative of the parallaxes in the two directions of the coordinate system.

Thus, the parallaxes are obtained with the same accuracy with which the coordinate values of the measuring point are found.

By the two different light sources and the change from transmitted to reflected light the measuring fields are relieved from unnecessary details and the entire measuring operation is thereby greatly facilitated.

It will be found to be of advantage to subdivide the coordinate system into centimeters and to subdivide the reading scales into millimeters by double strokes. By choosing a great transmission ratio, e.g. a transmission ratio in the order of 1:50 the displacement of the measuring scales 18 can be measured with an accuracy down to a few $\mu$.

It will be easily apparent that the invention is not limited to a stereoscopic construction which has been described merely by way of an example.

In case approximate measured values are sufficient, the device of the present invention can be of a more simple construction than the example heretofore described inasmuch as the means for executing the fine measurement can be omitted. The measurement with such a simplified device is completed after having displaced the pattern and the coordinate system to achieve an approximate coincidence of the measuring point in the pattern and the stationary measuring mark and having ascertained the coordinate lines closest to the measuring point, for example by means of the two counters associated with the coarse measuring unit.

It will be understood that this invention is susceptible to modification in order to adapt it to different usages and conditions, and, accordingly, it is desired to comprehend such modifications within this invention as may fall within the scope of the appended claims.

What I claim is:

1. Device for measuring the coordinates of reference points in a planar pattern, comprising, in combination, a transparent carrier bearing the pattern, a transparent support with a colorless coordinate system engraved therein and supporting said carrier with said pattern, means for displacing said support and said carrier with said pattern in the directions of the coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern coincides with said measuring mark, and means for indicating the degree of movement of said support and carrier with the pattern in the directions of the coordinates whereby said indicating means indicates the coordinate lines closest to said measuring mark so as to indicate approximately the measured value of the coordinates.

2. Device for measuring the coordinates of reference points in a planar pattern, comprising, in combination, a transparent carrier bearing the pattern, a transparent support with a colorless coordinate system engraved therein and supporting said carrier with said pattern, said carrier with said pattern and said support with said coordinate system being composed of material having substantially the same heat expansion coefficient, means for displacing said support and said carrier with said pattern in the directions of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern coincides with said measuring mark, and means for indicating the degree of movement of said support and carrier with the pattern in the directions of the coordinates whereby said indicating means indicates the coordinate lines closest to said measuring mark so as to indicate approximately the measured value of the coordinates.

3. Device for measuring the coordinates of reference points in a planar pattern, comprising, in combination, a transparent carrier bearing the pattern, a transparent support with a colorless coordinate system engraved therein and supporting said carrier with said pattern, means for displacing said support and said carrier with said pattern in the directions of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern coincides with said measuring mark, means for indicating the degree of movement of said support and carrier with the pattern in the directions of the coordinates whereby said indicating means indicates the coordinate lines closest to said measuring mark so as to indicate approximately the measured value of the coordinates, at least one reading scale having a plurality of strokes, means for displacing said reading scale in the direction of the coordinates relative to said support with said coordinate system, said reading scale being displaced until the lines of said coordinate system situated closest to said measuring mark coincide with the strokes on said reading scale closest thereto, the displacement of said reading scales being indicative of the fine measured value correcting the approximate value.

4. Device for measuring the coordinates of reference points in a planar pattern, comprising, in combination, a transparent carrier bearing the pattern, a transparent support with a colorless coordinate system engraved therein and supporting said carrier with said pattern, means for displacing said support and said carrier with said pattern in the directions of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern approximately coincides with said measuring mark, means for indicating the degree of movement of said support and carrier with the pattern in the directions of the coordinates whereby said indicating means indicates the coordinate lines closest to said measuring mark so as to indicate approximately the measured value of the coordinates, a glass plate and at least one reading scale on said glass plate having a plurality of strokes, and means for displacing said reading scale in the directions of the coordinates, relative to said support with said coordinate system, said reading scale being displaced until the lines of said coordinate system situated closest to said measuring mark coincide with the strokes on said reading scale closest thereto, the displacement of said reading scales being indicative of the fine measured value correcting the approximate value, objective lens means producing an intermediate image of said pattern and said coordinate system in the plane in which there extend said measuring mark and said glass plate, and ocular means for viewing said intermediate image.

5. Device for measuring the coordinates of reference points in a planar pattern, comprising, in combination, a transparent carrier bearing the pattern, a transparent support with a colorless coordinate system engraved therein and supporting said carrier with said pattern, first cross-slide means for displacing said support and said carrier with said pattern in the directions of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern approximately coincides with said measuring mark, means for indicating the degree of movement of said support and carrier with the pattern in the directions of the coordinates whereby said indicating means indicates the coordinate lines closest to said measuring mark so as to indicate approximately the measured value of the coordinates, a glass plate having a plurality of strokes thereon forming a reading scale, and second cross slide means for displacing said reading scale in the directions of the coordinates relative to said support with said coordinate system, said reading scale being displaced until the lines of said coordinate system situated closest to said measuring mark coincide with the strokes on said reading scale closest thereto, the displacement of said reading scales being indicative of the fine measured value correcting the approximate value, objective lens means producing an intermediate image of said pattern and said coordinate system in the plane in which there extend said measuring mark, and said glass plate, and ocular means for viewing said intermediate image.

6. A device as described in claim 4, further comprising a first spindle driving said first cross-slide means in one direction of the coordinates and a second spindle driving said first cross-slide means in the other direction of the coordinates, a lever and a third spindle driving said second cross-slide in one direction of the coordinates and another lever and a fourth spindle driving said second cross-slide in the other direction of the coordinates.

7. A device as described in claim 4, further comprising a first spindle driving said first cross-slide means in one direction of the coordinates and a second spindle driving said first cross-slide means in the other direction of the coordinates, a lever and a third spindle driving said second cross-slide in one direction of the coordinates and another lever and a fourth spindle driving said second cross-slide in the other direction of the coordinates, the transmission ratio of said third and fourth transmission gear being in the order of 1:50.

8. Device as described in claim 4, further comprising a first spindle driving said first cross-slide means in one direction of the coordinates, a first transmission gear and a first counter coupled with said first spindle via said first transmission gear, a second spindle driving said first cross-slide means in the other direction of the coordinates, a second transmission gear and a second counter coupled with said second spindle via said second transmission gear, a lever and a third spindle driving said second cross-slide in one direction of the coordinates, a third transmission gear and a third counter coupled with said third spindle via said third transmission gear, another lever and a fourth spindle driving said second cross-slide in the other direction of the coordinates, a fourth transmission gear and a fourth counter coupled with said fourth spindle via said fourth transmission gear.

9. Device for measuring the coordinates of reference points in a planar pattern, comprising, in combination, a transparent carrier bearing the pattern, a transparent support with a colorless coordinate system engraved therein and supporting said carrier with said pattern, means for displacing said support and said carrier with said pattern in the direction of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern approximately coincides with said measuring mark, means for indicating the degree of movement of said support and carrier with the pattern in the directions of the coordinates whereby said indicating means indicates the coordinate lines closest to said measuring mark so as to indicate approximately the measured value of the coordinates, a glass plate and at least one reading scale in said glass plate having a plurality of double strokes subdividing said scale into millimeters, the coordinate system being divided into centimeters, means for displacing said reading scale in the directions of the coordinates relative to said support with said coordinate system, said reading scale being displaced until the lines of said coordinate system situated closest to said measuring mark coincide with the strokes on said reading scale closest thereto, the displacement of said reading scales being indicative of the fine measured value correcting the approximate value.

10. Stereoscopic device for measuring the coordinates of reference points in a planar pattern comprising, in combination, a casing, two units in said casing, each unit comprising a transparent carrier bearing a pattern, the transparent support with a colorless coordinate system engraved therein and supporting said carrier with said pattern, means for displacing said support and said carrier with said pattern in the direction of coordinates of said coordinate system, a measuring mark stationary relative thereto, first lighting means adapted to produce light rays transmitted by said support and second lighting means adapted to produce light rays reflected therefrom, said coordinate system being invisible whenever said first light source is in operation and said pattern being invisible whenever said second light source is in operation, said support with said coordinate system and said carrier with said pattern being displaced until a predetermined reference point in said pattern approximately coincides with said measuring mark, means for indicating the degree of movement of said support and carrier with the pattern in the directions of the coordinates whereby said indicating means indicates the coordinate lines closest to said measuring mark so as to indicate approximately the measured value of the coordinates, a glass plate and at least one reading scale in said glass plate having a plurality of strokes, and means for displacing said reading scale in the directions of the coordinates, relative to said support with said coordinate system, said reading scale being displaced until the lines of said coordinate system situated closest to said measuring mark coincide with the strokes on said reading scale closest thereto, the displacement of said reading scales being indicative of the fine measured value correcting the approximate value, objective lens means producing an intermediate image of said pattern and said coordinate system in the plane in which there extend said measuring mark and said glass plate, and ocular means for viewing said intermediate image.

References Cited in the file of this patent

UNITED STATES PATENTS 2,039,231     Lindner _____ Apr. 28, 1936

FOREIGN PATENTS 186,002     Austria _____ June 25, 1956
747,343     Great Britain _____ Apr. 4, 1956

OTHER REFERENCES

Zeitschrift fur Instrumentenkunde, March 1902, pages 75, 76, 77.